(12) United States Patent
Wu

(10) Patent No.: US 11,139,567 B2
(45) Date of Patent: Oct. 5, 2021

(54) COMPACT DUAL-BAND MIMO ANTENNA AND MOBILE TERMINAL

(71) Applicant: AAC Technologies Pte. Ltd., Singapore (SG)

(72) Inventor: Jing Wu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 49 days.

(21) Appl. No.: 16/709,952

(22) Filed: Dec. 11, 2019

(65) Prior Publication Data

US 2020/0212561 A1 Jul. 2, 2020

(30) Foreign Application Priority Data

Dec. 31, 2018 (CN) .......................... 201811650609.8

(51) Int. Cl.
*H01Q 21/28* (2006.01)
*H01Q 1/52* (2006.01)
*H01Q 9/04* (2006.01)
*H04B 7/0413* (2017.01)
*H01Q 5/392* (2015.01)

(52) U.S. Cl.
CPC ............. *H01Q 1/523* (2013.01); *H01Q 5/392* (2015.01); *H01Q 9/0421* (2013.01); *H01Q 21/28* (2013.01); *H04B 7/0413* (2013.01)

(58) Field of Classification Search
CPC ...... H01Q 1/523; H01Q 5/392; H01Q 9/0421; H01Q 21/28
See application file for complete search history.

(56) References Cited

FOREIGN PATENT DOCUMENTS

| CN | 206236793 B1 | 6/2017 |
| CN | 109742526 A1 | 5/2019 |

OTHER PUBLICATIONS

PCT search report dated Jan. 23, 2020 by SIPO in related PCT Patent Application No. PCT/CN2019/113363(4 Pages).
1st Office Action dated Mar. 16, 2020 by SIPO in related Chinese Patent Application No. 201811650609.8 (6 Pages).

*Primary Examiner* — Graham P Smith
(74) *Attorney, Agent, or Firm* — W&G Law Group

(57) ABSTRACT

A compact dual-band MIMO antenna and a mobile terminal are provided, and the antenna includes a system ground unit, a radiation arm having an open-circuit end and a short-circuit end, a first antenna formed at the open-circuit end and a second antenna formed at the short-circuit end. The first antenna includes a grounding arm connecting the radiation arm with the system ground unit, and a first feeding arm located between the grounding arm and the open-circuit end. The second antenna includes a second feeding arm located between the short-circuit end and the grounding arm. Compared with the related art, the present invention has following beneficial effects: the antenna has compact structure and high isolation; it has dual-band, and it has excellent performance in the dual bands; it has a simple structure, a small volume and a light weight, and it is convenient to manufacture and thus for mass production.

4 Claims, 3 Drawing Sheets

COMPACT DUAL-BAND MIMO ANTENNA AND MOBILE TERMINAL

TECHNICAL FIELD

The present invention relates to the field of communications technologies, and in particular, to a compact dual-band MIMO antenna and a mobile terminal.

BACKGROUND

With the development of mobile communication technology, Multiple-Input Multiple-Output (MIMO) technology has received great attention as an important means to improve data transmission rate. By utilizing the MIMO technology, a channel capacity can be increased, and reliability of the channel can also be improved, and a bit error rate is reduced. Moreover, the MIMO technology is considered as one of alternative key techniques for next-generation communication (5G) technology. However, the MIMO antenna is an important part of the MIMO system, and its performance directly affects performance of the MIMO system. At present, the MIMO antenna technology faces many critical difficulties, such as problems of antenna coupling and polarization isolation. To reduce coupling between the antennas, improving isolation is a main content in studying the antenna system. To solve these problems, many structures that greatly increase the isolation between the antennas begin to come into people's attention.

BRIEF DESCRIPTION OF DRAWINGS

Many aspects of exemplary embodiment can be better understood with reference to following drawings. Components in the drawings are not necessarily drawn to scale, the emphasis instead being placed upon clearly illustrating principles of the present invention. Moreover, in the drawings, like reference numerals designate corresponding parts throughout the several views.

DESCRIPTION OF EMBODIMENTS

The present invention will be further illustrated with reference to the accompanying drawings and the embodiments.

Figure 1:
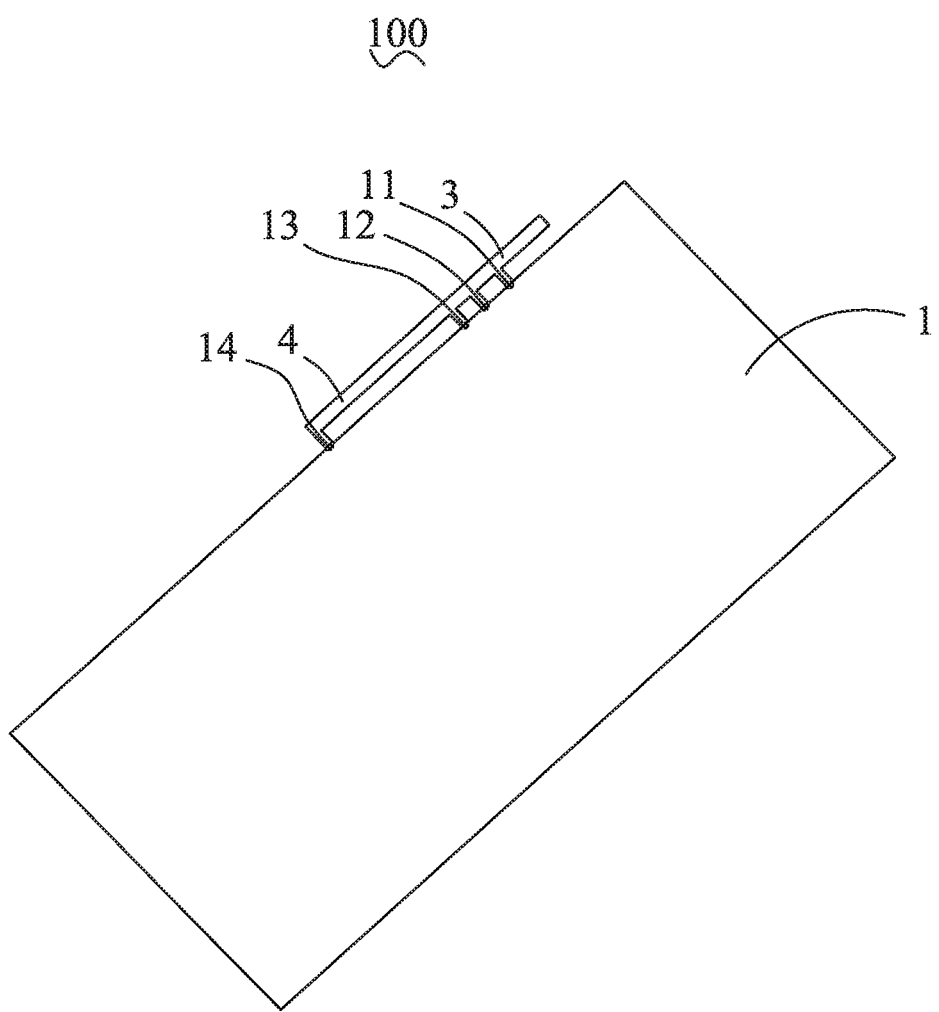
FIG. 1 is a partial structural schematic diagram of a compact dual-band MIMO antenna according to the present invention.
Figure 2:
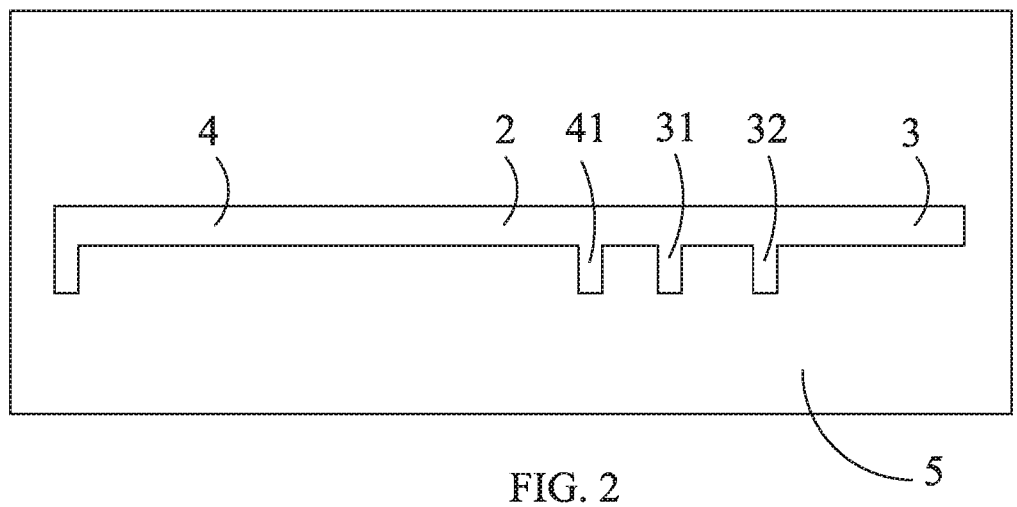
FIG. 2 is another partial structural schematic diagram of a compact dual-band MIMO antenna according to the present invention.

Referring to FIG. 1 and FIG. 2, a first aspect of the present invention relates to a compact dual-band MIMO antenna 100, and the compact dual-band MIMO antenna 100 includes a system ground unit 1, a radiation arm 2 having an open-circuit end and a short-circuit end, a first antenna 3 formed at the open-circuit end, and a second antenna 4 formed at the short-circuit end. In one embodiment of the present invention, the first antenna 3 can be an inverted-F antenna, and the second antenna 4 can be a loop antenna that forms an orthogonal mode with the inverted-F antenna. It is appreciated that, the present invention is not limited thereto. For example, it is also possible that the second antenna 4 is an inverted-F antenna while the first antenna 3 is a loop antenna that forms an orthogonal mode with the inverted-F antenna, which can be specifically determined according to actual needs.

With continued reference to FIG. 1 and FIG. 2, the first antenna 3 further includes a grounding arm 31 connecting the radiation arm 2 with the system ground unit 1, and a first feeding arm 32 located between the grounding arm 31 and the open-circuit end. The second antenna 4 further includes a second feeding arm 41 located between the short-circuit end and the grounding arm 31.

The first antenna 3 and the second antenna 4 in the compact dual-band MIMO antenna 100 of the present invention share one radiation arm 2, such that the antenna can have a compact and simple structure, a small volume and a light weight, and it is convenient to manufacture and thus for mass production. In addition, the first antenna 3 may be an inverted-F antenna and the second antenna 4 is a loop antenna that forms an orthogonal mode with the inverted-F antenna, so that the isolation of the antenna structure can be improved.

With continued reference to FIG. 1 and FIG. 2, the system ground unit 1 sequentially includes a first feeding point 11, a first grounding point 12, a second feeding point 13, and a second grounding point 14. The first feeding arm 32 is connected to the first feeding point 11, and the first grounding point 12 is connected to the grounding arm 31. The second feeding point 13 is connected to the second feeding arm 41, and the second grounding point 14 is connected to the short-circuit end. In one embodiment, as shown in FIG. 2, the first feeding point 11 and the second feeding point 13 may be symmetrically disposed on both sides of the grounding arm 31.

In the compact dual-band MIMO antenna 100 according to the present invention, the first feeding arm 32 is connected to the first feeding point 11, and the first grounding point 12 is connected to the grounding arm 31. The second feeding point 13 is connected to the second feeding arm 41, and the second grounding point 14 is connected to the short-circuit end. Therefore, in the present invention, by appropriately setting the positions of the first feeding point 11 and the second feeding point 13 to be adjacent to each other, to facilitate a radio frequency front-end and T/R wiring and design.

With continued reference to FIG. 1 and FIG. 2, the compact dual-band MIMO antenna 100 further includes a substrate layer 5. The first antenna 3 and the second antenna 4 are disposed on the substrate layer 5. The substrate layer 5 is made of plastic, and the substrate layer 5 may be an antenna holder, a terminal back shell or a PBC and so on.

The first antenna 3 and the second antenna 4 are formed on the substrate layer 5 by an FPC, LDS or PCB process. It is appreciated that, the present invention is not limited to specific processes, and any other feasible process should be also within the scope of the present invention.

Figure 3:
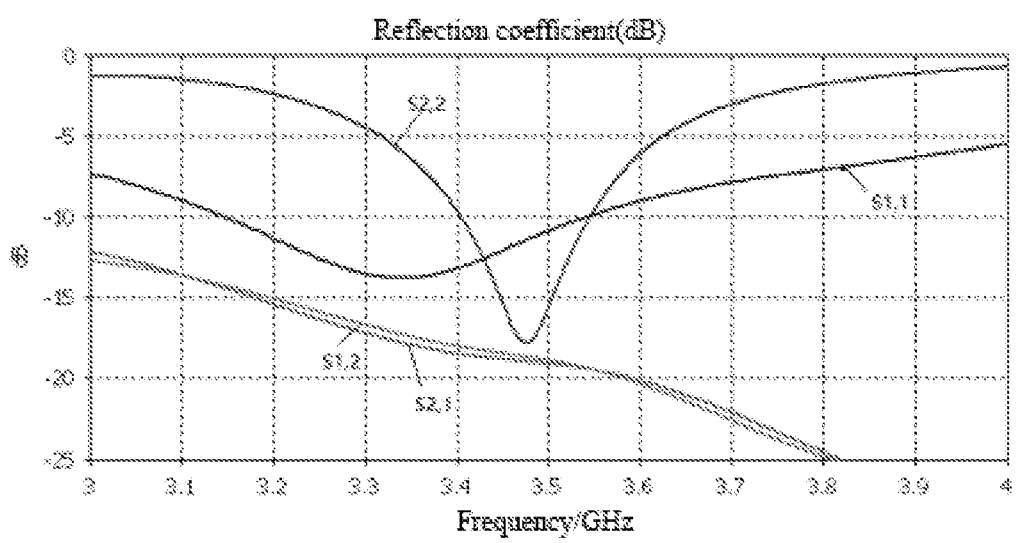
FIG. 3 illustrates S-parameter curves of a first antenna and a second antenna of a compact dual-band MIMO antenna according to the present invention.
Figure 4:
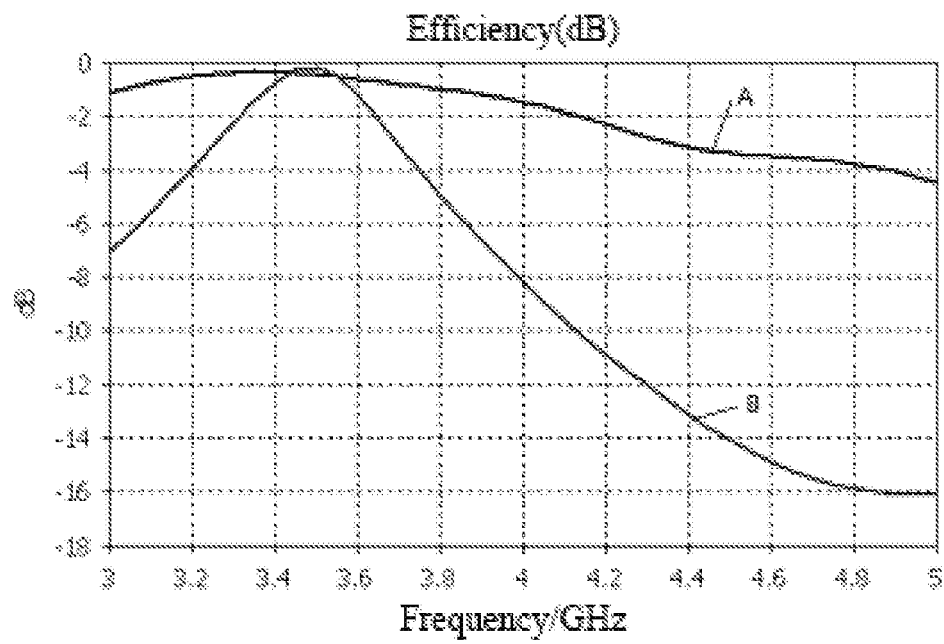
FIG. 4 illustrates efficiency curves of a first antenna and a second antenna of a compact dual-band MIMO antenna according to the present invention.
Figure 5:
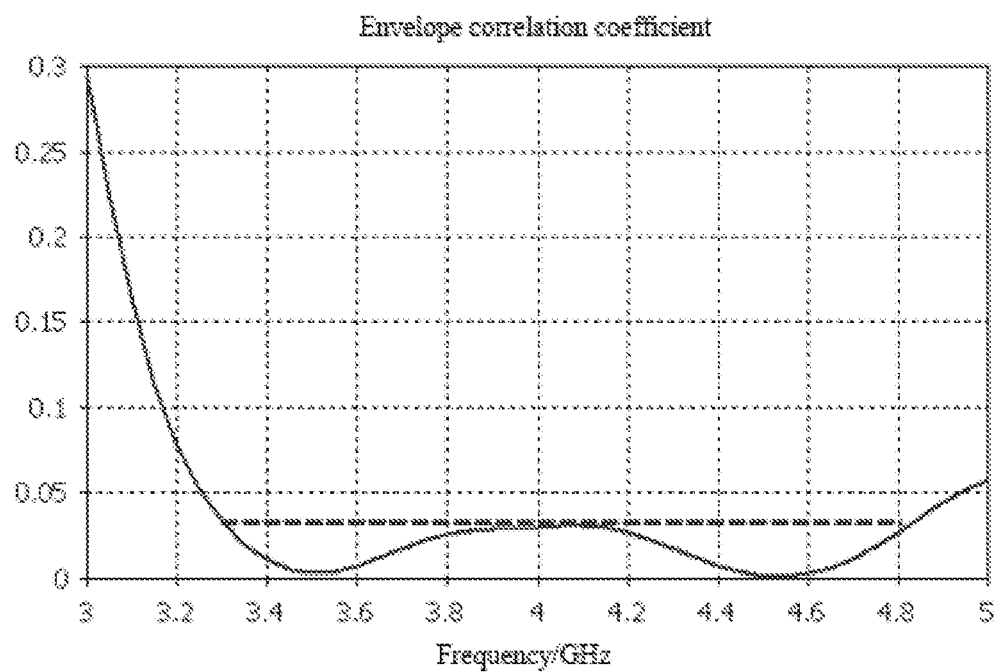
FIG. 5 illustrates an envelope correlation coefficient curve between a first antenna and a second antenna of a compact dual-band MIMO antenna according to the present invention.

For the performance of the compact dual-band MIMO antenna 100, reference is made to FIGS. 3-5. In FIG. 3, S1, 1 is a reflection coefficient of the first antenna 3, and S2, 2 is a reflection coefficient of the second antenna 4, and S1, 2 and S2, 1 may represent the isolation between the first antenna 3 and the second antenna 4. In FIG. 4, a curve A indicates the efficiency of the first antenna 3, and a curve B indicates the efficiency of the second antenna 4. As can be seen from the drawing, both the first antenna 3 and the second antenna 4 can work in the band of Sub-6 GHz (3.3-3.6 GHz and 4.8-5.0 GHz), and the isolation is excellent in this band.

Compared with the related art, the present invention has following beneficial effects: the antenna has a compact structure and a high isolation; it has dual-band, and it has excellent performance in the dual bands; it has a simple structure, a small volume and a light weight, and it is convenient to manufacture and thus for mass production.

A second aspect of the present invention relates to a mobile terminal, which may be, for example, an electronic device such as a mobile phone, a computer, or a tablet. The mobile terminal includes the compact dual-band MIMO antenna 100 described above, and for details, reference can be made to the related descriptions above, which will not be described herein.

The mobile terminal of the present invention has the structure of the compact dual-band MIMO antenna 100 described above, and the first antenna 3 and the second antenna 4 share one radiation arm 2, which can make the structure of the antenna compact and simple, easy to process, small in volume and light in weight, and convenient for mass production. In addition, the first antenna 3 may be an inverted-F antenna, and the second antenna 4 is a loop antenna that forms an orthogonal mode with the inverted-F antenna, so that the isolation of the antenna structure can be improved.

What have been described above are only embodiments of the present invention, and it should be noted herein that those skilled in the art can make improvements without departing from the inventive concept of the present invention, but these are all within the scope of the present invention.

What is claimed is:

1. A compact dual-band MIMO antenna, comprising:
   a system ground unit;
   a radiation arm comprising an open-circuit end and a short-circuit end; and
   a first antenna formed at the open-circuit end and a second antenna formed at the short-circuit end,
   wherein the first antenna comprises a grounding arm connecting the radiation arm with the system ground unit and a first feeding arm located between the grounding arm and the open-circuit end, and the second antenna comprises a second feeding arm located between the short-circuit end and the grounding arm;
   wherein the first antenna is an inverted-F antenna, and the second antenna is a loop antenna that forms an orthogonal mode with the inverted-F antenna;
   wherein the system ground unit sequentially comprises a first feeding point, a first grounding point, a second feeding point, and a second grounding point, the first feeding arm is connected to the first feeding point, the first grounding point is connected to the grounding arm, the second feeding point is connected to the second feeding arm, and the second grounding point is connected to the short-circuit end;
   wherein the first feeding point and the second feeding point are symmetrically disposed on two sides of the grounding arm.

2. The compact dual-band MIMO antenna as described in claim 1, further comprising:
   a substrate layer on which the first antenna and the second antenna are disposed.

3. The compact dual-band MIMO antenna as described in claim 2, wherein the first antenna and the second antenna are formed on the substrate layer by an FPC process, an LDS process or a PCB process.

4. A mobile terminal, comprising the compact dual-band MIMO antenna as described in claim 1.

* * * * *